United States Patent [19]
Yamato et al.

[11] Patent Number: 5,488,689
[45] Date of Patent: Jan. 30, 1996

[54] ROBOT OPERATION TRAINING SYSTEM

[75] Inventors: Kunitada Yamato, Kakogawa; Masato Fuji, Akashi; Naohiro Fukuda, Kakogawa, all of Japan

[73] Assignee: Kawasaki Jukogyo Kabushiki Kaisha, Japan

[21] Appl. No.: 313,726

[22] Filed: Sep. 26, 1994

Related U.S. Application Data

[63] Continuation of Ser. No. 996,610, Dec. 24, 1992, abandoned.

[30] Foreign Application Priority Data

Sep. 18, 1992 [JP] Japan .................. 4-250106

[51] Int. Cl.$^6$ ............................ B25J 13/00; B25J 9/22
[52] U.S. Cl. ............................................................ 395/99
[58] Field of Search ................... 395/80, 87, 88, 395/92, 99; 318/568.13; 901/3, 4, 5

[56] References Cited

U.S. PATENT DOCUMENTS

| | | | |
|---|---|---|---|
| 4,379,335 | 4/1983 | Kirsch et al. | 395/99 |
| 4,831,548 | 5/1989 | Matoba et al. | 395/99 |
| 4,998,050 | 3/1991 | Nishiyama et al. | 395/99 |
| 5,053,975 | 10/1991 | Tsuchihashi et al. | 395/99 |
| 5,136,223 | 8/1992 | Karakama et al. | 395/92 |

FOREIGN PATENT DOCUMENTS

| | | | |
|---|---|---|---|
| 1306187 | 12/1989 | Japan | B15J 9/22 |
| 1-306187 | 12/1989 | Japan | B25J 9/22 |

OTHER PUBLICATIONS

Japanese Abstract M–940 vol. 14 No. 97 p. 84 JP 1306187 "Operation Instructing Method for Robot", Dec. 11, 1989.
Sjolund et al, "Robot Task Planning: Programming using Interactive Computer Graphics" Proc of 13th ISIR, 1983.
Eydgohi et al, "A Computer Animation of Robotic Manipulators and Workcells", IEEE Control Systems Magazine, vol. 11 Iss 4 pp. 56–59 Jun. 1991.
Eydgohi et al, " Computer Animat Simulation of Robotic Manipulators and Workcell Design" Proc of 33rd Midwest Symposium on Circuits & Systems, Aug. 12–14 1990, pp. 1175–1178 vol. 2.
White et al, "A Graphics Simulator for a Robert Arm", IEEE Transactions on Education, vol. 32, No. 4, pp. 417–429, Nov. 1989.
Chen et al, "Simulation and Graphical Interface for Programming and Visualization of Sensor Based Robot Operation", IEEE Int'l Conf on Robotics & Automation, May 12–14, 1992, pp. 1095–1101 vol. 2.
Japanese Abstract M–940, vol. 14, No. 97, p. 84, Dec. 11, 1989.

*Primary Examiner*—Robert W. Downs
*Attorney, Agent, or Firm*—Oliff & Berridge

[57] ABSTRACT

To start robot training before an actual robot is manufactured or installed, the robot operation training system has a controller substantially the same as the actual robot controller and a personal computer for simulating the functions of the robot body. The training system can be applied easily to various robots of different models.

9 Claims, 4 Drawing Sheets

ROBOT OPERATION TRAINING SYSTEM

This is a continuation of application Ser. No. 07/996,610 filed Dec. 24, 1992, now abandoned.

BACKGROUND OF THE INVENTION

1. Field of the Invention

The present invention relates to a robot operation training system and, more specifically, to a robot operation training system without use of an actual robot.

2. Description of the Prior Art

With the advance of technology with respect to industrial robots, the operation of such robots has become more and more complicated. Therefore, whenever a new robot is installed, it is necessary to train the operator as to how to manipulate the robot. In addition, recently, there have been remarkable technological innovations and therefore various kinds of novel robots various kinds have been put on the market. Thus the necessity and the frequency of training for robot operation has increased.

A prior art method of training robots is disclosed in Japanese Patent Application Laid-open No. 1-306187, for instance, in which certain instruction programs are used, instead of an instructor dispatched from a robot manufacturer. The training program displays the next operation to be performed on a display unit (e.g. cathode ray tube) in sequence in response to the operator's operation.

In this prior art training method, however, the training is performed with the use of an actual robot to be installed, which makes it difficult for the manufacturer and the user for the following reasons. At present, since the robot operation training is performed with the use of an actual robot, it is impossible to perform the robot training before the robot to be delivered has been completely manufactured. Alternately, it is necessary to prepare another robot for only the operation training that is the same as the robot to be installed. Therefore, whenever a robot is manufactured and sold, there exists an economical problem in that a high training cost, a large training space, and a long preparation time for the transportation, installation, adjustment, etc. are required further, there exists another problem in that since an actual robot is used for training, an expensive robot may be damaged due to an erroneous operation.

SUMMARY OF THE INVENTION

With these problems in mind, it is the object of the present invention to provide a robot operation training system, by which the operation training of complicated robots can be performed without use of any actual robots.

To achieve the above-mentioned object, the robot operation training system of the present invention comprises: teaching data inputting means for inputting teaching data; control means for generating encoder command data to a robot in response to the teaching data inputted through the teaching data inputting means; display means for displaying a shape of the robot; and picture describing means for outputting data indicative of change in position due to robot motion on a coordinate system displayed on the display means, on the basis of the encoder command data.

The picture describing means preferably comprises calculating means for calculating end point positions of the robot on the coordinate system by transforming the encoder command data into angular data and display data forming means for reforming data displayed on the display means by obtaining picture positions on the display means on the basis of output of the calculating means.

The robot operation training system preferably further comprises feedback means for feeding back the current encoder data to the control means by delaying the encoder command data by a predetermined delay time so as to become the current data. The robot motion is displayed in animation on the basis of the encoder data sequentially outputted from the control means.

In the robot operation training system according to the present invention, since the controller is substantially the same as the actual robot used and since the functions performed by the robot body are simulated by replacing the robot with the personal computer, it is unnecessary to use the actual robot. Therefore, it is possible to start the operation training before the robot to be installed is completely manufactured, without need of robot installing space and a long preparation time and without damaging the actual robot. Further, the training system can be applied easily to various robots of different models.

DETAILED DESCRIPTION OF THE PREFERRED EMBODIMENTS

An embodiment of the robot operation training system according to the present invention will be described hereinbelow with reference to the attached drawings.

Figure 1:
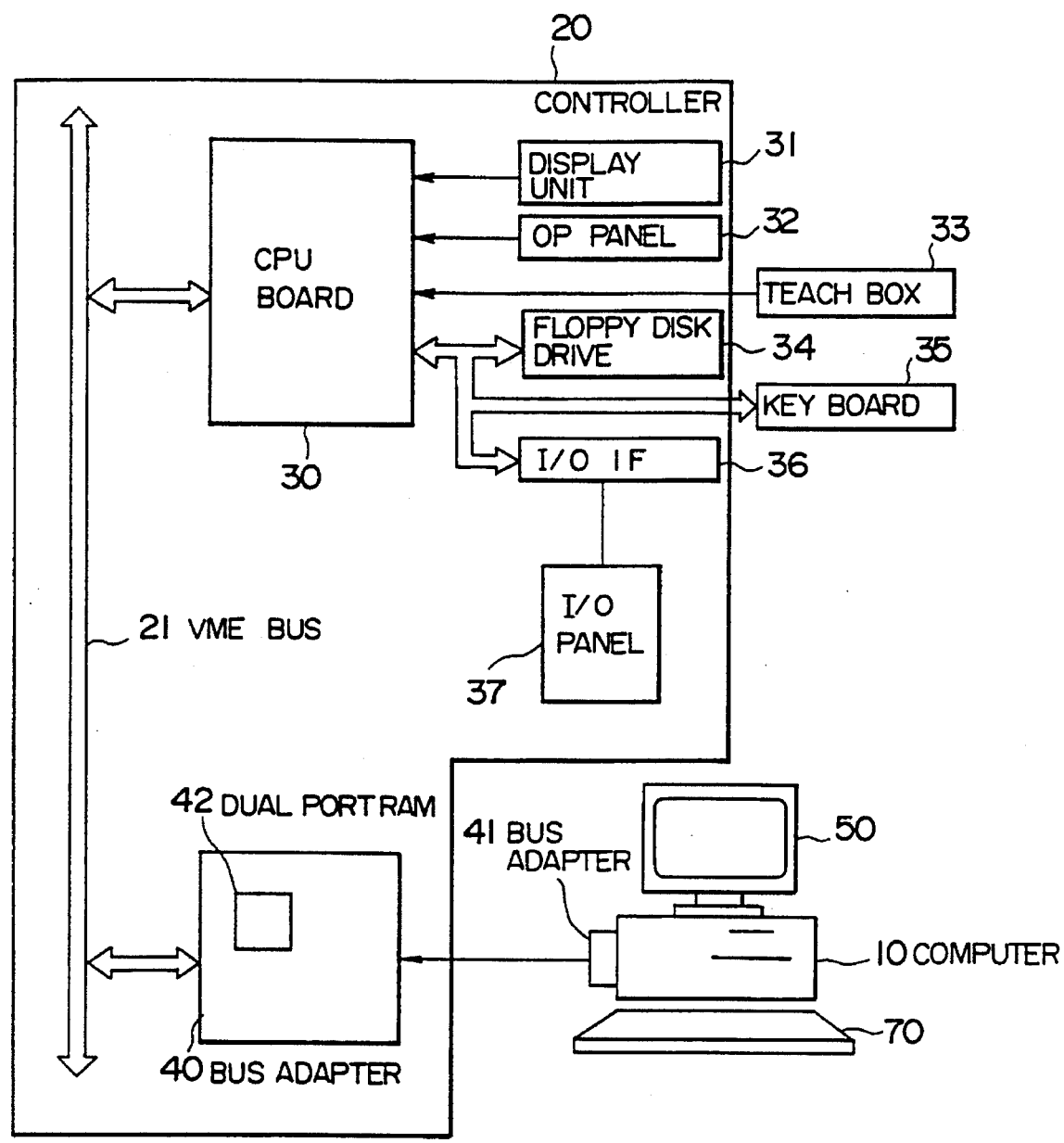
FIG. 1 is a system block diagram showing the hardware configuration of an embodiment of the robot operation training system according to the present invention.

The hardware configuration of the embodiment thereof will be described with reference to FIG. 1. In the drawing, the system comprises a real robot controller 20 connected to a personal computer 10. The personal computer 10 is an IBM PC/AT, for instance or others interchangeable thereto, to which a keyboard 70 and a CRT display unit 50 are connected. The controller 20 is basically the same as an actual robot control system in configuration and function. However, an actual robot body is not used, and therefore no power unit is provided.

The configuration of the controller 20 will be described in more detail. A CPU board 30 and a bus adapter 40 are connected to a VME bus 21, which is the international standard bus in the robot control field. To the CPU board 30, there are connected various units such as a display unit 31 disposed on a console, for displaying various information, an operation panel 32 disposed on the console for performing various operations, a teaching box 33 connected to the system for inputting various instruction information, a floppy disk unit 34, a keyboard 35, and an external input/output interface unit 36 connected to an I/O panel 37.

Further, a bus adapter 40 including a dual port RAM 42 is also connected to the CPU board 30 through the VME bus 21.

The functional configuration of the robot operation training system according to the present invention will be described hereinbelow with reference to FIG. 2, in which the various functions mainly executed by the personal computer 10 are shown.

The flow of data in this robot operation training system will be described hereinbelow with reference to FIG. 2. Encoder command data B generated from the controller 20 are transmitted to an interrupt processing section 11. This interrupt processing section 11 transmits the encoder data E to a logging processing section 12 by exchanging the control information A between the controller 20 and the interrupt processing section 11 under simultaneous communications processing. Further, the logging processing section 12 transmits the encoder data E transmitted from the interrupt processing section 11 to the controller 20 as the current data C and further to a data cue processing section 13 as data D. In more detail, on the basis of a delay time data previously stored in a memory 18 (a data storing section of the personal computer), the logging processing section 12 transmits the same data delayed by the delay time to the controller 20 and the data cue processing section 13 as the current encoder data.

The data cue processing section 13 is connected to a buffer memory 60 (e.g. hard disk device) via a log file processing section 14. The data cue processing section 13 processes the data D and transmits the processed data F to the log file processing section 14. Therefore, the data cue processing section 13 serves to store the data D to be displayed in off-line mode in the buffer memory 60 as the data M.

The data D passed through the data cue processing section 13 are further transmitted to a data arithmetic processing section 15 as data G. The data arithmetic processing section 15 transforms the encoder values G into angular data on the display picture, with reference to data classified according to the robot data and tool data stored in the memory 18, and further calculates the position of an end point of the robot hand or tool on the display picture.

These angular and positional data K are given to the on-line display data forming section 16. The on-line display data forming section 16 reconstructs the data to be displayed on the basis of the display condition information read from the memory 18, and outputs the reconstructed data to a CRT display unit 50 as display data N.

As a result, the changes in posture of the robot and tool can be displayed on the display picture in real-time mode.

Further, the data stored in the memory 18 can be added, modified, and deleted by activating a function key processing section 17 by depression of function keys or other keys arranged on a keyboard 70 connected to the personal computer.

Figure 2:
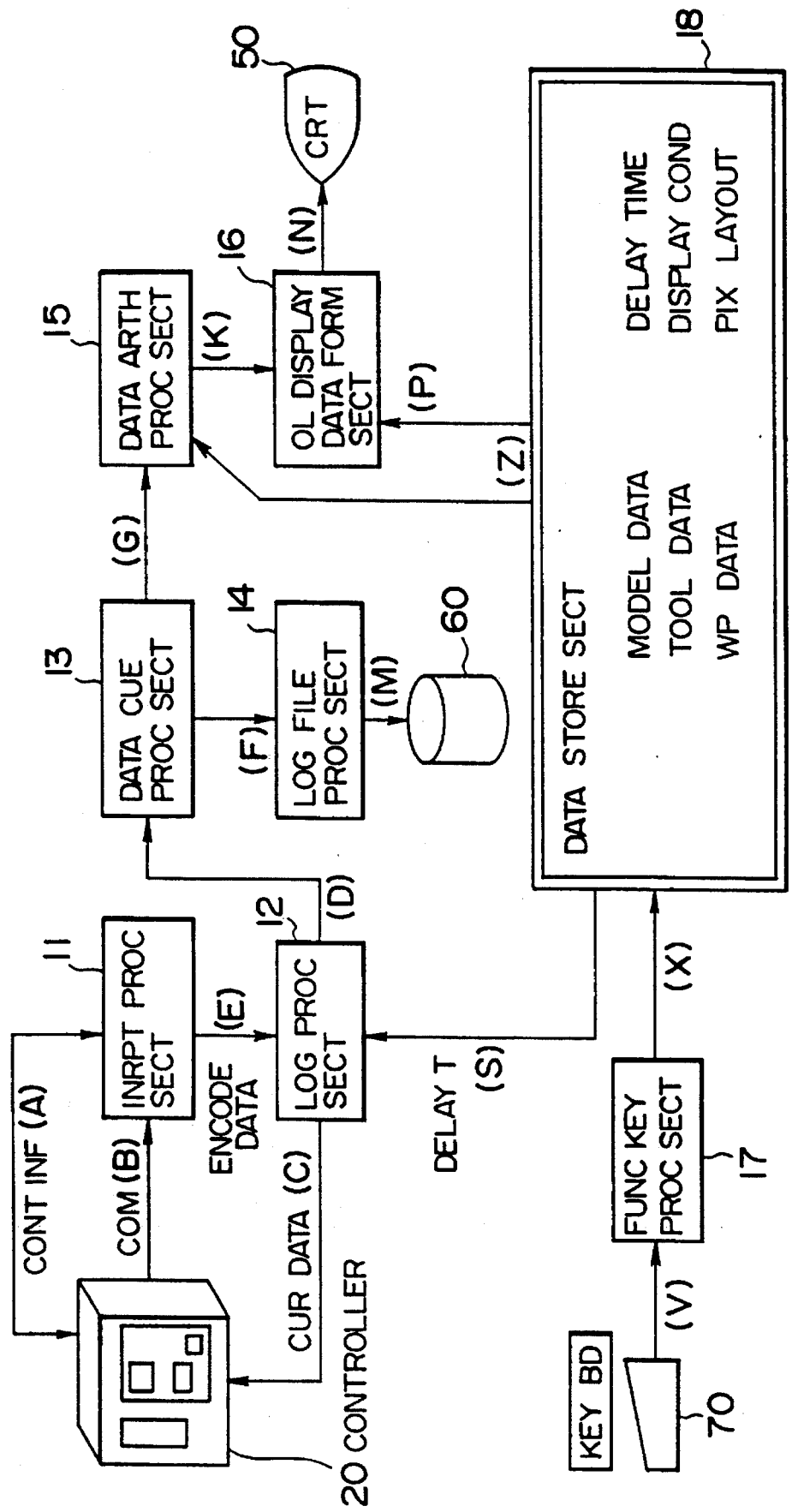
FIG. 2 is a block diagram showing the functional configuration of the robot operation system according to the present invention.
Figure 3:
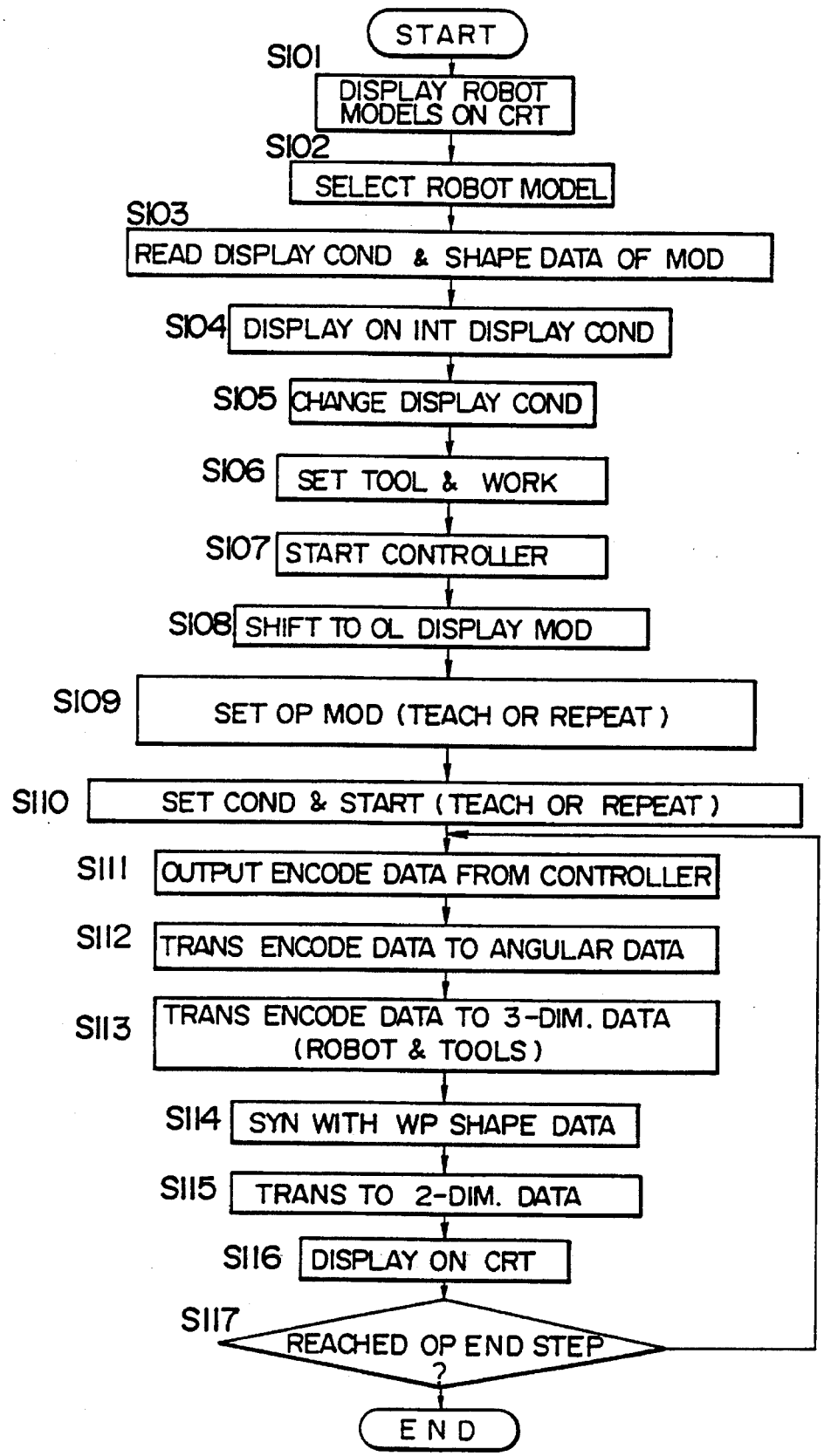
FIG. 3 is a flowchart for assistance in explaining the processing procedure of the robot operation training system according to the present invention.

The processing operation of the robot operation training system according to the present invention as shown in FIG. 2 will be described hereinbelow with reference a flowchart shown in FIG. 3.

When the system is started, a picture for allowing the operator to select any one of robot models is displayed on the CRT display 50 (in step S101). On the basis of this picture, when the operator selects one robot model (in step S102), the on-line display data forming section 16 reads the initial display condition information and the shape data of the selected robot model from the memory 18 (in step S103), forms the display picture layout and the display data on the basis of the read information, and then displays the formed display results on the CRT display 50 (in step S104).

Subsequently, the display conditions such as the display magnification, the direction of visual point, the number of pictures to be displayed simultaneously, etc. are changed where necessary (in step S105). In addition, a tool is attached on the robot, and a workpiece is set where required (in step S106).

Under these conditions, when the controller 20 is activated (in step S107), an on-line display mode is established between the controller 20 and the CRT display 50 (in step S108).

Thereafter, when the operator sets the operation mode to a teaching mode (in step S109) to execute the teaching by use of a teaching box 33 (in step S110), the encoder command data B given from the controller 20 are transmitted as encoder command data G to the arithmetic processing section 15 via the interrupt processing section 11, the logging processing section 12 and the data cue processing section 13 (in step S111). Here, the encoder command data G are transformed into angular data with reference to the robot data read from the memory 18 (in step S112), and further the shape data of the robot and tool read from the memory 18 are transformed into three-dimensional shape data on the basis of the angular data at the current positions (in step S113). Further, the above-mentioned data are synthesized with the shape data of a workpiece read from the memory 18 (S114).

The synthesized shape data are further transformed into shape data to be displayed on a coordinate system (i.e. the direction of visual point) determined as the picture displaying conditions read from the memory 18 to obtain the shape data to be displayed (in step S115). Therefore, the above-mentioned information can be displayed on the CRT display 50 (in step S116). The above-mentioned data displaying steps from S111 to S116 are executed repeatedly until the control reaches the operation end. Therefore, the operation designated by the teaching is displayed on the display unit in the form of animated picture.

The teaching mode can be executed as described above. In the case of the repeat mode, on the other hand, the operation mode of the controller is set to the repeat mode in step S109, and repeat conditions are set in step S110 to execute the operation quite the same as in the teaching mode.

Figure 4:
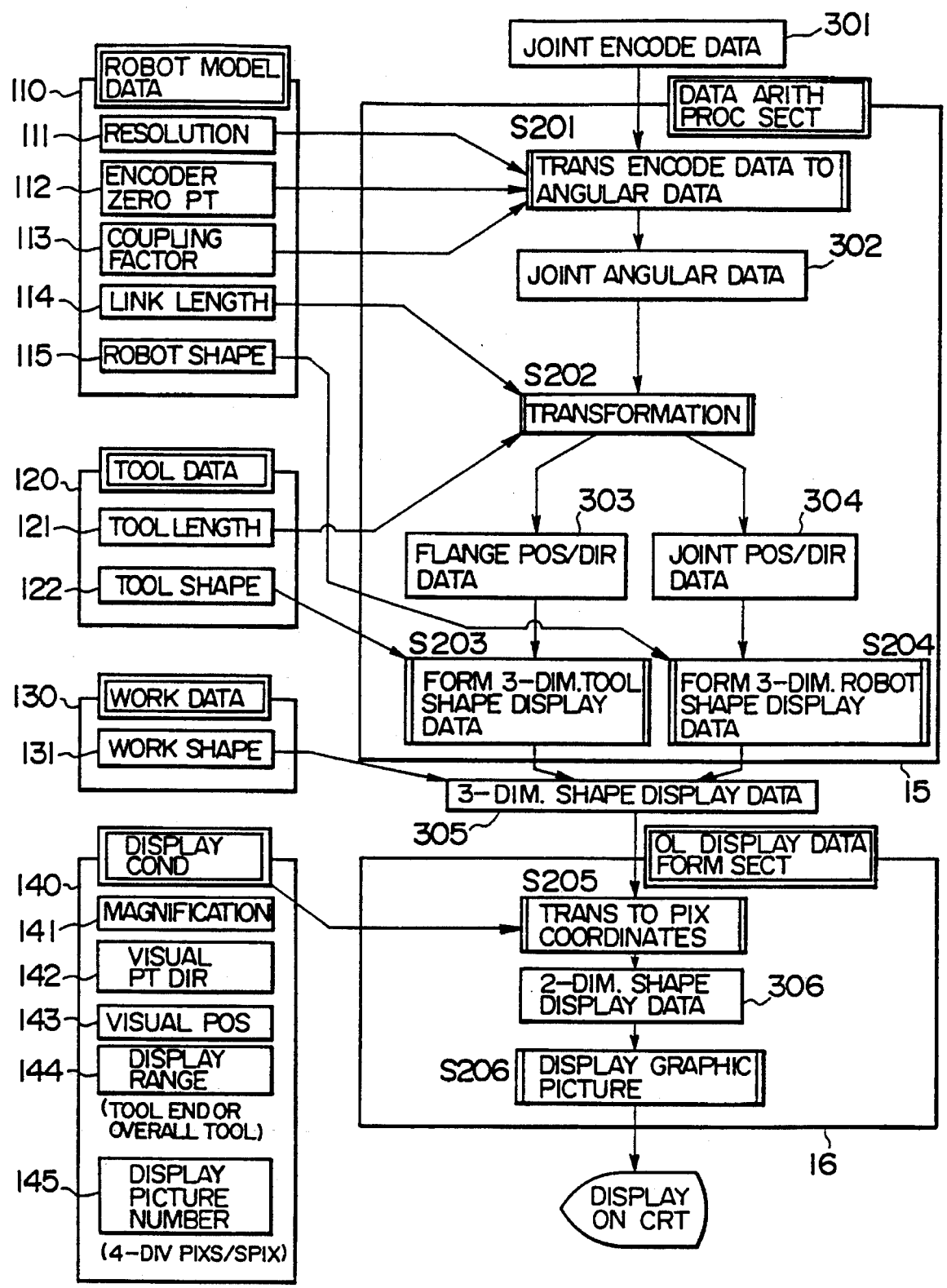
FIG. 4 is a flowchart for assistance in explaining the way of transforming various data in the robot operation training system according to the present invention.

The way of transforming various data in the robot operation training system according to the present invention will be described hereinbelow with reference to a flowchart shown in FIG. 4.

First, the data arithmetic processing section 15 executes various data calculations on the basis of the encoder data 301 for robot joints. That is, the encoder data 301 are transformed into angular data 302 on the basis of resolution data 111, encoder zero-point data 112, and coupling factor 113 stored in a robot model data storing means 110 included in the memory 18 (in step S201). Sequentially, transformations are executed on the basis of link length data 114 included in the robot model data and tool length data 121 stored in a tool data storing means 120 included in the memory 18 (in step S202) to obtain the flange surface position and direction data 303 and position and direction data 304 of the robot joint. In addition, three-dimensional tool shape data for display are formed on the basis of the tool shape data 122 included in the tool data and the flange surface position and direction data 303 (in step S203). Further three-dimensional robot shape data for display are formed on the basis of the robot shape data 115 included in the robot model data (in step S204). Therefore, three-dimensional shape data 305 can be obtained together with workpiece shape data 131 stored in the workpiece data storing means 130 included in the memory 18.

On the basis of these three-dimensional shape data for display 305, the on-line display section 16 executes the display operation. In more detail, the on-line display section 16 control transforms the display coordinate system on the display picture on the basis of the display condition data such as the magnification data 141, the visual point direction data 142, the visual point position data 143, the display range data 144, etc., the display picture number data 145 indicative of whether only one picture or two-divided pictures are displayed, etc. all stored in the display condition storing means 140 included in the memory 18 (in step S205) to obtain two-dimensional shape data 306 for display. On the basis of the two-dimensional shape data 306, the on-line display section 16 executes a graphical picture display (in step S206).

As described above, in the robot operation training system according to the present invention, the operator can confirm visually whether the robot taught as described above can operate satisfactorily. Accordingly, when the robot motion taught is not satisfactory, the operator can immediately correct the teaching operation and further check the results. So, it is possible to quickly master the robot operation and further to realize an excellent robot motion.

As described above, in the robot operation training system according to a present invention, the controller substantially the same as the actual robot is used. Further, the functions of the robot body are simulated by the personal computer. Therefore, since it is unnecessary to use the actual robot equipment, it is possible to start the operation training before the robot to be installed is completely manufactured. This eliminates the need of a large robot installing space and a long preparation time and avoids damaging the robot equipment. Further, the training system can be applied easily to various robots of different models.

What is claimed is:

1. A robot operation training system, comprising:

teaching data inputting means for inputting teaching data;

control means for receiving the teaching data and generating and sequentially outputting encoder command data to control an operation of a real robotic arm in response to the teaching data inputted through said teaching data inputting means;

display means for displaying visual model of simulated robot motion in animation responsive to the teaching data; and picture describing means for calculating and outputting said visual model to be displayed on the display means, on the basis of the encoder command data sequentially outputted from said control means without connecting the real robotic arm, wherein said picture describing means, said teaching data inputting means and said control means comprise a real controller for the real robotic arm, and said picture describing means comprises personal computer.

2. The robot operation training system as claimed in claim 1, wherein said picture describing means comprises:

robot posture calculating means for calculating data for a position and direction of portions of a simulated robot on the basis of the encoder command data sequentially outputted from said control means; and display data forming means for reforming and outputting the visual model to be displayed on said display means, on the basis of the data of position and direction of portions of the simulated robot outputted from said robot posture calculating means.

3. The robot operation training system as claimed in claim 1, which further comprises feedback means for feeding back the encoder command data to said control means with a predetermined delay time for the control means to use the fed back encoder command data as output encoder command data instead of encoder command data of an actual robot, and wherein robot motion is displayed in animation on the basis of the encoder command data sequentially output from said control means.

4. A simulated robot control system for robot operation training system with a personal computer comprising:

an input that inputs encoder command data for teaching purposes;

a memory that stores simulation data including robot data, tool data and workpiece data;

display instructor means for instructing a simulated robot with a connected tool and a positioned workpiece to be displayed based on the data stored in said memory;

control means coupled to said input, said memory, and said display instructor means, said control means for outputting input encoder command data to control an operation of a real robotic arm, said control means comprising a real controller for a real robotic arm; and transformer means coupled to said control means for receiving the encoder command data output from said control means, for transforming the encoder command data into angular and shape data of the simulated robot and tool based on the data stored in said memory and for outputting the angular data and the shape data to said display instructor means to display the simulated robot, tool and workpiece in animation without operating the real robotic arm, wherein said memory, said display instructor means and said transformer means comprise a personal computer.

5. The simulated robot control system as claimed in claim 4 further comprising a mode setter means coupled to said control means for setting said control means in a teaching mode.

6. The simulated robot control system as claimed in claim 4 wherein said transformer means further transforms the robot and tool data from said memory into three-dimensional shape data based on the angular data.

7. The simulated robot control system as claimed in claim 4 wherein said transformer means further unites the transformed shape data with the workpiece data from said memory.

8. The simulated robot control system as claimed in claim 4, wherein said memory stores robot data including end point data and movable joint data.

9. The simulated robot control system as claimed in claim 4 wherein said display instructor reforms coordinate positions of the simulated robot and tool displayed on the personal computer based on the angular data.

* * * * *